Figure 1:
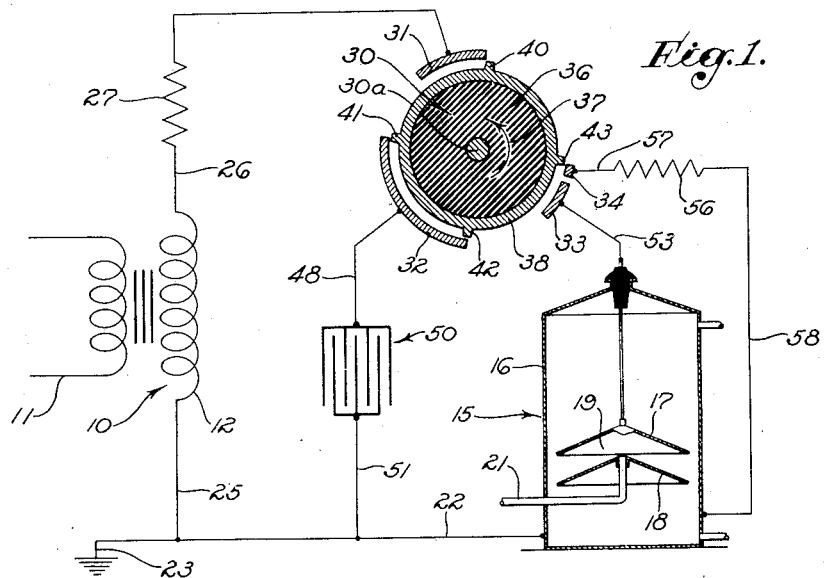

May 23, 1939. H. WOLFE 2,159,682
METHOD AND APPARATUS FOR TREATING EMULSIONS
Filed Nov. 25, 1936

INVENTOR
HALLEY WOLFE
BY
HARRIS, KIECH, FOSTER & HARRIS

Clarence F. Kiech

ATTORNEYS

Patented May 23, 1939

2,159,682

UNITED STATES PATENT OFFICE 2,159,682

METHOD AND APPARATUS FOR TREATING EMULSIONS

Halley Wolfe, Long Beach, Calif., assignor to Petroleum Rectifying Company of California, Los Angeles, Calif., a corporation of California Application November 25, 1936, Serial No. 112,830

12 Claims. (Cl. 204—24)

The present invention relates to a novel method and apparatus for treating fluid by use of electrical surges. For instance, it has been found that certain emulsions can be satisfactorily separated into their constituent phase liquids by periodically charging a condenser and discharging same through a pair of electrodes bounding a treating space in which the emulsion is positioned.

In treating by exclusive use of condenser discharges it has been proposed to alternately connect the condenser to a source of potential and to the electrodes. I have found that the limited time available for transmitting this surge to the electrodes, and the characteristics of the treating system, precludes complete discharge of the condenser. After disconnecting same from the electrodes there is still a residual charge thereon. When the condenser with this residual charge is again connected to the charging source a steep wave front surge is developed which tends to burn out the source.

This phenomenon is especially noticeable if the source is of alternating potential and if the condenser with its residual charge is connected to the source during a half cycle succeeding the half cycle during which the condenser was first charged. In this instance the residual charge on the condenser and the newly applied potential of the source are additive. A surge of such intensity and of such steep wave front is produced that it will quickly burn out the potential supply means; for instance, a transformer. Under such conditions the secondary windings of even the so-called "surge proof" transformers have been burned out through piercing of the insulation.

It is an object of the present invention to eliminate such destructive surges by substantially completely discharging the condenser before again connecting it to the charging source.

Another object of the invention is to substantially completely discharge the condenser before it is again connected to the source by paralleling this condenser with a discharge circuit of such character that the charge can be dissipated therein before the condenser is again connected to the source; for instance, during a succeeding half cycle.

Another object of the invention is to provide a surge-producing circuit of improved operating characteristics.

Another object of the invention is to provide a novel surge-producing circuit including an improved rotary switching system.

Further objects and advantages of the invention will be made evident to those skilled in the art from the following description.

Referring to the drawing:

Fig. 1 is a wiring diagram indicating the mode of connection.

Figure 2:
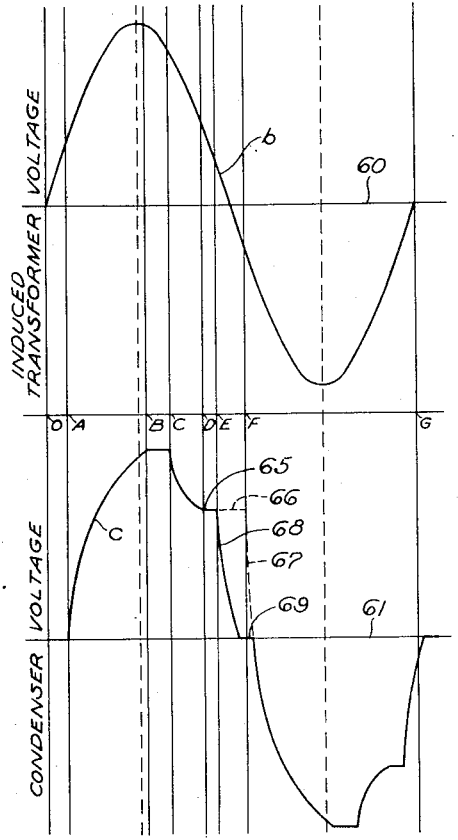

Fig. 2 graphically illustrates sequence of operations.

Referring to the schematic diagram of Fig. 1, the system shown is energized from an alternating potential source illustrated as including a transformer 10 provided with primary and secondary windings 11 and 12. For purpose of illustration, the surge-producing circuit therein shown is used in conjunction with an electric dehydrator 15 for separating the phase liquids of an emulsion. Various types of such dehydrators may be used, the one diagrammatically shown including a tank 16 with electrodes 17 and 18 therein, insulated from each other and defining a treating space 19 in which is positioned the emulsion to be treated. Batch treatment is possible, but if desired the emulsion may be continuously introduced into the tank 16 and the phase liquids separately withdrawn therefrom in any conventional manner, or the treater may be utilized to merely coalesce the dispersed particles of the emulsion, actual separation taking place in a separate container.

In the embodiment illustrated the electrode 18 is electrically connected to the tank 16 through a support 21, the tank being grounded through a conductor 22 as indicated at 23. Grounding of the system in this manner is not essential in all instances, nor is it necessary that one of the electrodes be at ground potential.

One terminal of the high tension secondary winding 12 of the transformer is connected to the conductor 22 through a conductor 25. A conductor 26 connects the other terminal of this high tension winding to a damping impedance 27, usually in the form of a high resistance. The impedance 27 is desirable in order to prevent oscillations in the resonant circuit formed by the condenser 50 and the transformer 10. In a resonant circuit (formed by an inductance and a condenser in series) oscillations will be produced when a voltage is suddenly induced in the circuit providing the series resistance of the circuit has a low value. These oscillations may result in voltages considerably larger than the voltage which gives rise to them. Introduction of the damping resistance 27 of suitable value prevents oscillations and thus protects the insulation of the condenser and of the transformer from dangerously high voltages.

A rotary switch 30 in effect comprises several switching means for closing the various circuits to be described. Disposed around an axis 30a are four shoes, respectively designated as first, second, third, and fourth shoes, 31, 32, 33, and 34. These shoes are approximately of the dimension shown and may be of arcuate shape to define peripheral portions of a rotor space in which a rotor 36 turns about the axis 30a in a direction indicated by the arrow 37. This rotor is preferably driven by synchronous means so as to turn in step with the undulations of the alternating potential. It includes a conductor means shown as including a ring 38 of conducting material provided with teeth 40, 41, 42, and 43 spaced equidistant from each other and extending outward toward the shoes 31 to 34 but terminating short thereof to provide narrow gaps which break down upon application of potentials which are only a fraction of the peak potential of the transformer 10.

The second shoe 32 is connected by a conductor 48 to one terminal of a condenser 50, the other terminal being connected by a conductor 51 to the conductor 22, and thus to the electrode 18. The third shoe 33 is connected to the electrode 17 through a conductor 53. The fourth shoe 34 is connected to a circuit paralleling the condenser 50. This circuit is preferably of low impedance and is hereinafter termed a discharge circuit. It is shown as including a resistor 56 connected to the fourth shoe 34 by a conductor 57, a conductor 58 connecting this resistor to the electrode 18, in this instance through the tank 16. The design of this discharge circuit may vary with different installations, its function being to substantially completely discharge the condenser 50 after partial discharge thereof to the electrodes 17 and 18. For example, a resistor in the neighborhood of 15 ohms is usually quite satisfactory, though much higher or lower values may be used. Any low-impedance circuit may be used so long as it substantially completely discharges the condenser 50 within the time available.

The mode of operation of this system can best be understood by correlation of Figs. 1 and 2. Fig. 2 graphically represents two curves drawn on a common abscissa scale representing time, the distance OG representing one complete cycle of the alternating potential. The upper portion of this figure shows by curve b the relationship between the voltage in the secondary winding 12 due to magnetic flux induced by the primary winding 11 (plotted as ordinates), and time (plotted as abscissa). The line 60 represents zero potential, and the resulting voltage curve is of the usual sinusoidal type. The lower portion of Fig. 2 plots condenser voltage (as ordinates), against time (as abscissa, and on the same scale as in the upper portion of this figure), as shown by curve c. The line 61 indicates zero potential.

If an alternating potential source is utilized, successive half waves will be of opposite polarity. For example, the first half of curve b in Fig. 2 represents a positive half cycle, while the succeeding half cycle is negative. In the embodiment to be specifically described, the following sequence of events happen during the first half cycle: (1) the condenser is charged, (2) the condenser is partially discharged to the electrodes, leaving a residual charge thereon, and (3) this condenser is connected to the discharge circuit to substantially completely discharge same. During the succeeding half cycle the same sequence takes place, the potentials being reversed so that the condenser is oppositely charged.

Assuming that the condenser 50 is not charged, and that the rotor 36 is just approaching the position shown in Fig. 1, the corresponding time is indicated at O. At a time A after the rotor has turned only very slightly to assume the position illustrated, the induced transformer voltage will become large enough to rupture the thin gaps between the first shoe 31 and the tooth 40, and between the second shoe 32 and the tooth 41, and current will begin to flow to the condenser. The voltage on the condenser will continue to rise, along with the transformer voltage until a time B is reached when the tooth 40 leaves the vicinity of the first shoe 31 and thus breaks the arc connection previously existing between the transformer 10 and the condenser 50. The tooth 41 will at this time lie near the mid-section of the second shoe 32. In this manner the condenser 50 is charged.

The voltage on the condenser 50 will remain constant during the time from B to C, the condenser during this time being completely disconnected from the source. This constant potential on the condenser is indicated by the horizontal line of the curve c, between B and C.

At the time C, however, the rotor will have turned to such position that the tooth 42 will be sufficiently close to the third shoe 33 to permit disruptive discharge therebetween, thus connecting the condenser across the electrodes 17 and 18, the surge flowing across the gap between the second shoe 32 and the tooth 41, along the ring 38, and across the gap between the tooth 42 and the third shoe 33. A very steep wave front surge is thus transmitted to the electrodes at this instant of time and serves to coalesce the dispersed particles of the emulsion into masses of sufficient size to gravitationally separate from the continuous phase if allowed to stand. However, under ordinary operating conditions, the fluid in the dehydrator will not have sufficient conductivity to remove more than a small portion of the charge on the condenser 50. The time of discharge of the condenser to the electrodes is represented between C and D, and is controlled by the length of the third shoe 33, it being clear that at the point D the arc between the tooth 42 and the third shoe 33 has just been broken by separation of these elements.

As the condenser 50 has been only partially discharged, the voltage thereof at time D when it is disconnected from the treater is considerable, being represented by the ordinate distance between the point 65 and the line 61. In the absence of any further discharge of this condenser through a discharge circuit, the charge thereon will remain until time F is reached, as indicated by the horizontal dotted line 66. At this time F the induced potential will have passed through zero as shown by the upper curve b, of Fig. 2. Thus, if the condenser 50 is then connected to the transformer (as through breakdown of the gap between the tooth 43 and the first shoe 31, and between the tooth 40 and the second shoe 32), the potentials of the condenser and the transformer will be additive and will produce a very steep wave front surge through the secondary windings 12, as indicated by the dotted line 67. This transient phenomenon is so severe, and has such a steep wave front, that it will quickly pierce the insulation on the secondary winding of a usual transformer. This type of surge has been found to pierce the insulation even on the so-called surge-proof transformers, the first known failure of these rigorously-designed sources.

To prevent this insulation-piercing transient, I provide the low-impedance discharge circuit paralleling the condenser. Through it the condenser can be substantially completely discharged. With the embodiment illustrated in Fig. 1, this is accomplished by switching the discharge circuit in circuit with the condenser at the time E when the tooth 42 moves from arcing position relative to the third shoe 33 and into arcing relationship with the fourth shoe 34. This will quickly discharge the condenser as indicated by the downward-extending portion 68 of the curve c. The condenser will remain substantially completely discharged until reconnected to the transformer, as indicated by the line 69. This auxiliary discharge of the condenser to remove residual charges may start during the first half cycle, but need not be necessarily completed therein. The speed at which the condenser will discharge will depend upon the characteristics of the low-impedance discharge circuit. On the other hand, if the third and fourth shoes 33 and 34 are electrically connected together somewhat similar results will be obtained by suitable design of the discharge circuit, for then the condenser will discharge in part through the discharge circuit and in part to the electrodes, starting at time C. More direct paralleling of the discharge circuit with the condenser 50 can also be used in which event the charge will begin to leak through the discharge circuit at time B, the charge being substantially completely destroyed before such time as the condenser is again connected to the transformer.

During the second half cycle the sequence will be substantially the same as previously described, except that the potentials will be reversed. This is indicated by that portion of the lower curve c, which lies below the second half cycle of the upper curve b.

This substantial removal of the residual charge on the condenser has additional advantages in improving the operating characteristics of the complete circuit. For instance, the effective value of the secondary current is reduced, thus reducing the heating in the transformer winding 12 and especially in the damping impedance 27. The power consumed by the apparatus is also considerably lessened. This dampening impedance 27 is also desirable from the angle previously mentioned, to wit preventing oscillations in the circuit including the condenser and the secondary winding of the transformer. Usually satisfactory results will be obtained if the impedance 27 comprises 15,000 ohm resistance, by way of example. It will be apparent that reducing the heating in such a resistance is another advantage made possible by dissipation of any residual charge on the condenser before reconnecting same to the transformer.

The invention is not limited to use of the particular type of rotary switch shown, nor to the use of a transformer as an energizing source. Other switches and other sources may be used without departing from the spirit of the invention, and fluids other than emulsion can be treated. Nor is the invention limited to a single discharge of the condenser before connection to a discharge circuit, for even if successive fractions of its charge are taken therefrom it is often desirable to reduce the residual charge before reconnection to the source. Nor is the invention limited to the particular means shown for paralleling the discharge circuit and the condenser. Various types of switching means or more direct connection can be utilized in this regard without departing from the spirit of the invention.

Nor is the invention limited to a discharge circuit which includes an impedance 56. In some instances this can be dispensed with, though it is desirable to use this expedient. Otherwise the residual energy in the condenser must be dissipated in heat in the gap adjacent the fourth shoe 34. By using an impedance 56 some, or substantially all, of the energy can be dissipated as heat therein rather than in this gap.

I claim as my invention:

1. A process for electrically treating emulsions by use of a condenser and a pair of electrodes bounding an emulsion-containing treating space, which process includes the steps of: first charging said condenser; partially discharging said condenser to said electrodes to coalesce the dispersed phase of said emulsion; establishing an auxiliary discharge circuit across said condenser to substantially completely discharge said condenser before again charging same thus completing a cycle; and then repeating this cycle of charging said condenser, partially discharging same to said electrodes and substantially completely discharging same through said auxiliary circuit.

2. A process for electrically treating emulsions by use of a condenser and a pair of electrodes bounding an emulsion-containing treating space, which process includes the steps of: first charging said condenser; then partially discharging said condenser to said electrodes to coalesce the dispersed phase of said emulsion; then further and substantially completely discharging said condenser into an auxiliary discharge circuit separate from the electrode circuit into which said condenser was partially discharged to complete a cycle; and then repeating this cycle of charging, partially discharging, and substantially completely discharging said condenser.

3. A process for electrically treating an emulsion in an electrode-bounded space by use of condenser discharges, which process includes the steps of: first charging said condenser by connecting same to an alternating potential for a fraction of a half cycle; then partially discharging said condenser to said electrodes to establish a steep wave front surge to said emulsion of sufficient intensity to coalesce the dispersed phase thereof, said partial discharging taking place during said half cycle and thus before said alternating potential reverses polarity on a succeeding half cycle; and further discharging said condenser during the remaining portion of said first-mentioned half cycle to substantially remove the charge thereon before connecting said condenser in charging relationship to said source during said succeeding half cycle of reversed polarity, thus eliminating the additive surge-forming potentials of said source and said condenser if said condenser is not substantially completely discharged before being again connected to said source during said succeeding half cycle.

4. In combination in a treating system for fluids: a pair of electrodes bounding a treating space containing the fluid to be treated; a source of potential; a condenser; switch means for first charging said condenser by electrically connecting same to said source of potential; an electrode circuit connected to said electrodes; switch means for electrically connecting said condenser to said electrode circuit to partially discharge same to said electrodes; a discharge circuit of relatively low impedance; switch means for conneting said condenser to said discharge circuit to discharge same; and means for actuating said switch means to successively execute a cycle comprising charging said condenser, partially discharging said condenser into said electrode circuit and then further discharging said condenser into said discharge circuit.

5. In combination in an electric treating system for fluids: a pair of electrodes defining a treating space containing the fluid to be electrically treated; an electrode circuit connected to said electrodes; a condenser; a source of alternating potential; means for connecting said condenser to said source in charging relationship to first charge same by use of a positive half cycle and later by use of a negative half cycle of the alternating potential source; switch means for connecting said condenser when in charged condition to said electrode circuit to send a steep wave front surge to said electrodes to partially but not completely discharge said condenser; and means for substantially completely discharging said condenser before said first-named means connects said condenser to said source to be charged by said negative half cycle.

6. In combination in an electric treating system for fluids: a pair of electrodes defining a treating space containing the fluid to be electrically treated; an electrode circuit connected to said electrodes; a condenser; a source of alternating potential; a discharge circuit of relatively low impedance; a rotary switching means for first connecting said condenser to said source thus charging said condenser, then connecting said condenser while charged to said electrode circuit to discharge said condenser only partially, and then connecting the partially discharged condenser to said discharge circuit for substantially completely discharging it; and means for driving said rotary switching means in step with said alternating potential and at such speed as to charge said condenser for only a part of a half cycle of said alternating potential, to complete the partial discharging of said condenser to said electrodes during the same half cycle, to connect the partially discharged condenser to said discharge circuit during the same half cycle, and then to next connect the condenser in charging relationship with said source during the next half cycle of said alternating potential which is of opposite polarity to start a new cycle of charging, partially discharging and substantially completely discharging said condenser.

7. In combination in an electric treating system for fluids: a pair of electrodes defining a treating space containing the fluid to be treated; a transformer providing a high-tension winding; a plurality of shoes spaced around an axis and including first, second, third, and fourth shoes; an impedance; means connecting said impedance in series circuit with said high-tension winding, said first shoe and one of said electrodes; a condenser; means connecting said condenser between said one of said electrodes and said second shoe; means connecting said third shoe to the other of said electrodes; a low-resistance circuit connecting said fourth shoe to said one of said electrodes; a rotor rotatable about said axis and providing conductor means adapted to electrically bridge said shoes in definite sequence when said rotor is continuously turned, said sequence being first a bridging of said first and second shoes to charge said condenser, second a bridging of said second and third shoes to partially discharge said condenser to said electrodes, and third a bridging of said second and fourth shoes to discharge said condenser further and substantially completely through said low-resistance circuit; and means for continuously turning said rotor.

8. A process for electrically treating a fluid between spaced electrodes by the exclusive use of condenser discharges, which process includes the steps of: first charging said condenser by connecting same to a source of alternating potential for a fraction of a half cycle; partially discharging said condenser to said electrodes to establish a steep wave front surge sufficient to treat the fluid between said electrodes; subsequently connecting said condenser to said source during a later half cycle in which the potential of said source is reversed with respect to the half cycle used in first charging said condenser; and substantially completely discharging said condenser through a low impedance discharge circuit before it is again charged by said source during said subsequent connection, thus eliminating the additive surge-forming potentials of said source and said condenser which would exist if said subsequent connection of said condenser to said source was effected while a residual charge remained on said condenser.

9. A process in transmitting condenser-produced steep wave front surges of alternating polarity to a load circuit including a fluid path for the surge, which process includes the steps of: first charging said condenser by connecting same to a source of alternating potential for a fraction of a positive half cycle thereof; then partially but not completely discharging said condenser by connecting it to said load circuit and disconnecting it therefrom while a residual charge remains on said condenser; subsequently connecting said condenser to said source during a later negative half cycle; and intermediately connecting said condenser in circuit with a low impedance discharge circuit to remove said residual charge before said condenser is subsequently charged by said source during said subsequent connection, thus eliminating the additive surge-forming potential of said source and condenser which would exist if said subsequent connection of said condenser to said source was effected while a large residual charge remained on said condenser.

10. In combination in a treating system for electrically treating a fluid in a treating space bounded by electrodes: a condenser; means for successively connecting said condenser to a source of potential to charge same and to said electrodes to partially discharge same to complete a cycle of operation; actuating means for actuating said first-named means to complete said cycle of operation repeatedly; and discharge means controlled by said actuating means to operate in step with the charging and partial discharging of said condenser for further and substantially completely discharging said partially-discharged condenser during each cycle of operation before the condenser is re-connected to said source in the succeeding cycle of operation.

11. A combination as defined in claim 10 in which said discharge means includes an auxiliary discharge circuit paralleling said condenser and switch means controlled by said actuating means to connect said condenser to said auxiliary discharge circuit.

12. In combination in a treating system for electrically treating a fluid in a treating space bounded by electrodes by use of a source of alternating potential in which a positive half cycle is followed by a negative half cycle: a condenser; a discharge circuit; switch means for connecting said condenser in succession to said source of said alternating potential and then to said electrodes and for connecting said condenser to said discharge circuit before subsequently connecting same to said source; and means operating in step with said alternating potential for actuating said switch means in such manner as to connect said condenser to said source during a positive half cycle and for only a fraction of this half cycle to charge said condenser, then to connect said condenser while charged and during the same positive half cycle to said electrodes and to said discharge circuit thereby substantially completely discharging said condenser, and to subsequently connect said condenser to said source during the succeeding half cycle of negative potential whereby at the time of this subsequent connection substantially no surge-forming residual charge remains on said condenser which would be oppositely poled with respect to said succeeding half cycle of negative potential.

HALLEY WOLFE.